US012626675B2

(12) United States Patent
Burgett

(10) Patent No.: US 12,626,675 B2
(45) Date of Patent: May 12, 2026

(54) WIPPEN OR REPETITION FLANGE BUSHING

(71) Applicant: Kirk Burgett, Sacramento, CA (US)

(72) Inventor: Kirk Burgett, Sacramento, CA (US)

(*) Notice: Subject to any disclaimer, the term of this patent is extended or adjusted under 35 U.S.C. 154(b) by 283 days.

(21) Appl. No.: 18/441,301

(22) Filed: Feb. 14, 2024

(65) Prior Publication Data

US 2025/0259607 A1 Aug. 14, 2025

(51) Int. Cl.
*G10C 3/24* (2006.01)
*G10C 3/22* (2019.01)

(52) U.S. Cl.
CPC *G10C 3/24* (2013.01); *G10C 3/22* (2013.01)

(58) Field of Classification Search
CPC ... G10C 3/24; G10C 3/22; F16C 27/02; F16C 17/22
See application file for complete search history.

(56) References Cited

U.S. PATENT DOCUMENTS 3,084,003 A * 4/1963 Matt ........................ F16C 33/08 138/147
3,859,885 A * 1/1975 Hayashida .............. F16C 27/02 84/251

FOREIGN PATENT DOCUMENTS

CN 1236152 A * 11/1999 ............. G10C 3/168

* cited by examiner

*Primary Examiner* — Erin Kryukova
(74) *Attorney, Agent, or Firm* — Craig A. Simmermon

(57) ABSTRACT

An injection molded wippen or repetition flange bushing for a grand piano action where the bushing has four supports posts or elongated appendages projecting outward from the outer surface of the sleeve member of the injection molded wippen or repetition flange bushing. The four supports posts help reduce or eliminate shrinkage of the sleeve member during the cooling stage in the manufacturing of the injection molded wippen or repetition flange bushing. This occurs because shrinkage occurs in the four support posts and not in the sleeve member portion of the injection molded wippen or repetition flange bushing. The result is a perfectly straight bushing with an extremely precise and accurate bushing surface that produces perfect wippen or repetition rotation.

2 Claims, 16 Drawing Sheets

WIPPEN OR REPETITION FLANGE BUSHING

BACKGROUND OF THE INVENTION

1. Field of the Invention

This invention relates to a bushing in a grand piano action. A grand piano produces sound as a result of a complicated mechanical chain reaction which starts with the pianist depressing a piano key which in turn actuates a piano action associated with the key which in turn rotates a hammer assembly associated with the piano action which in turn causes a hammer to rotate and strike a piano string or strings to make sound. Every grand piano has 88 keys that are each associated with one piano action and one hammer assembly. Thus, a grand piano has 88 piano actions and 88 hammer assemblies. Each piano action has a jack component that contacts and lifts a knuckle or roller attached to the hammer assembly in order to rotate a hammer and strike the piano string or strings to make sound. Specifically, this invention is a specially designed and shaped piano action bushing, which greatly increases the lifespan of piano actions. The end result is a substantial increase in longevity of piano actions and hammer assemblies as well as a dramatic improvement in the feel of playing a piano equipped with the special bushings. A typical grand piano has a lifespan of about 75 years and traditional piano actin bushings require replacement every 3-6 years whereas the bushings of this invention only require maintenance every 20-30 years.

2. Description of Related Art

A bushing, also known as a bush, is an independent plain bearing that is inserted into a housing or other part to provide a bearing surface for rotary applications. Common bushing designs include: sleeve, flanged, split, and clenched bushings. A sleeve bushing is a “sleeve” of material with an inner diameter, an outer diameter, and length. Piano action bushings are one-piece sleeve bushings. Piano action bushings are installed over a stationary pin or pivot pin. Piano action bushings rotate around the stationary pin or pivot pin.

Piano actions have bushings at all pivot points. There is a bushing on the wippen or repetition flange. There is an upper bushing and a lower bushing on the wippen or repetition. There is also a bushing on the tubular lever interface or hammer flange. Piano action bushings are required to eliminate clicks or unwelcome sounds that can emanate from a piano action during cycling or motion of the piano action. At least one piano action must cycle every time a piano makes a sound. Piano action bushings are also required to reduce wear and tear on the piano action components at the pivot points and to extend the life span of the piano action components. Additionally, piano action bushings help locate and hold all pivoting components in place during cycling or rotation of the piano actions. Thus, piano action bushings are required to hold rotating components in the proper place during rotation. Piano action components should rotate without any side-to-side movement. Side-to-side movement of rotating piano action components is highly frowned upon by pianists. When a bushing wears out, clicking may occur and/or the action components may move side-to-side or translationally during cycling or motion of the piano actions. Additionally, most piano actions are made of wood which is hydroscopic and thus expands and contracts according to its moisture content. Piano action bushings must be resilient to absorb this expansion and contraction from the wood piano action components in order to keep the wood piano action components tightly held in place during rotation. Thus, piano action bushings expand slightly when the wood parts shrink and contract slightly when the wood parts expand while keeping the pivoting members of the piano action in the proper location for unhindered rotation.

Piano action bushings have been made of felt throughout history. Felt is a textile that is produced by matting, condensing, and pressing fibers together. Felt can be made of natural fibers such as wool or animal fur, or from synthetic fibers such as petroleum-based acrylic or acrylonitrile or wood pulp-based rayon. Blended fibers are also common. Felt works well for a limited period of time however all felt bushings must be replaced every 5-10 years. Felt is moisture resistant but still does absorb a certain amount of moisture from the air which can cause deformation. Also felt dries out over time and becomes brittle which causes the bushings to shrink, crack, or otherwise fail. Worn out felt bushings can cause piano action components to cease up during the humid months and wear faster during the dry months. Thus, felt bushings may be improved upon.

Next came polytetrafluoroethylene (PTFE) piano action bushings. Polytetrafluoroethylene (PTFE) is s a synthetic fluoropolymer of tetrafluoroethylene that is also known by the brand name of Teflon®. PTFE piano action bushings were an improvement because PTFE is nonadherent with natural lubricity and PTFE is hydrophobic and thus does not absorb any moisture from the air. PTFE bushings have much longer lifespans than felt bushings for this reason. However, PTFE bushings still had problems because even though PTFE bushings are not hydroscopic, the wood piano action parts attached to the bushings still are hydroscopic. Thus, wood piano action parts would expand and contract while the bushings remained the same size. This caused the wood action parts to crush down onto the bushing during the wet seasons, resulting in a very tight action, and not allowing the parts to move properly. During the dry seasons, the wood would recede, causing the bushing to become loose a create a “clicking” noise while a pianist plays the piano. Another drawback to PTFE bushings is the softness or high degree of resilience. PTFE bushings must be soft or have a low durometer reading in order to ensure that the action parts would line up and rotate properly. This softness would ensure that the parts did not bind when the holes in the bushings were not perfectly straight or not perfectly perpendicular to the plane of rotation. This created a problem because the softness of the bushings meant that the bushings could still be damaged by rotation of the wood action parts and pivot pins. After a short period of time, the circular holes in the PTFE bushings could become oval or otherwise worn which allows for non-rotational movement of the piano action parts relative to the pivot pins and also causes clicks and deflection of the piano action parts. Deflection and loose parts cause premature wear of the piano action and annoy the pianist to a very large degree. The rate of wear was less than that of felt, but still the wear issue was a problem. Thus, the PTFE bushing idea was abandoned and piano action makers went back to the traditional felt bushings.

Next came composite piano action bushings. Wessel Nickel and Gross developed a composite bushing base and a composite hard bushing set that was an improvement over the PTFE bushings. Both the bushing and the base were hydrophobic. This meant that there was no deformation of the bushings from wet season to dry season. However, there was still a major problem with the composite bushings because it is nearly impossible to drill an accurate and precise hole through the bushing with the exact proper inner diameter and also exactly perpendicular or normal to the ends of the bushings and the plane of rotation as is required for proper functioning of the piano action bushings and the piano actions. A tolerances of less than five hundred thousandths of an inch is required to ensure an exact proper inner diameter that is exactly perpendicular to the plane of rotation so that the action parts do not bind up during rotation. These tolerances are so tight that it was nearly impossible to find any drill bit manufacturers who could make drill bits with the right amount of precision. Consequently, composite bushings resulted in a very costly manufacturing process which proved unacceptable to the point where many larger companies deemed the process to be impossible or impractical.

Next came injection molded piano action bushings. Injection molded bushings solved many of the problems mentioned above. However, injection molded bushings also introduced a new set of challenges that caused injection molded bushings to fail rather quickly. The problem with injection molded bushings is shrinkage. All injection molded parts or pieces always shrink during the molding process. Shrinkage is the result of the cooling of liquid plastic material to form a solid part inside the mold which occurs with every injection molded part. Shrinkage causes the circular holes in the bushings to deform into a non-circular or oval shapes or otherwise develop gaps in the circular or cylindrical hole. This issue caused the abandonment of injection molded piano action bushings. However, this invention has eliminated this problem with the use of a revolutionary new injection molding process and a revolutionary new bushing design. The bushings of this invention are injection molded directly into the piano action part with a very special shape that do not shrink or deform the circular or cylindrical hole in the center of the bushing from the injection molding process.

BRIEF SUMMARY OF THE INVENTION

It is an aspect of wippen or repetition flange bushing to be made of plastic or composite material.

It is an aspect of wippen or repetition flange bushing to have a sleeve member with an annular cylinder shape.

It is an aspect of wippen or repetition flange bushing to have a plurality of support posts projecting outwards from the outer surface of the sleeve member.

It is an aspect of each of the plurality of support posts projecting outwards from the sleeve member to be made of the same material as the sleeve member.

It is an aspect of each of the plurality of support posts projecting outwards from the sleeve member to be integral with the sleeve member and made from the same piece of material as the sleeve member.

It is an aspect of the sleeve member to remain in the annular cylinder shape with a nearly perfectly circular inner diameter after the entire wippen or repetition flange bushing incurs shrinkage resulting from an injection molding process.

It is an aspect of wippen or repetition flange bushing to last for many years and millions of piano action cycles without deformation of the nearly perfectly circular inner diameter of the annular cylinder shape.

DEFINITION LIST

Figure 1:
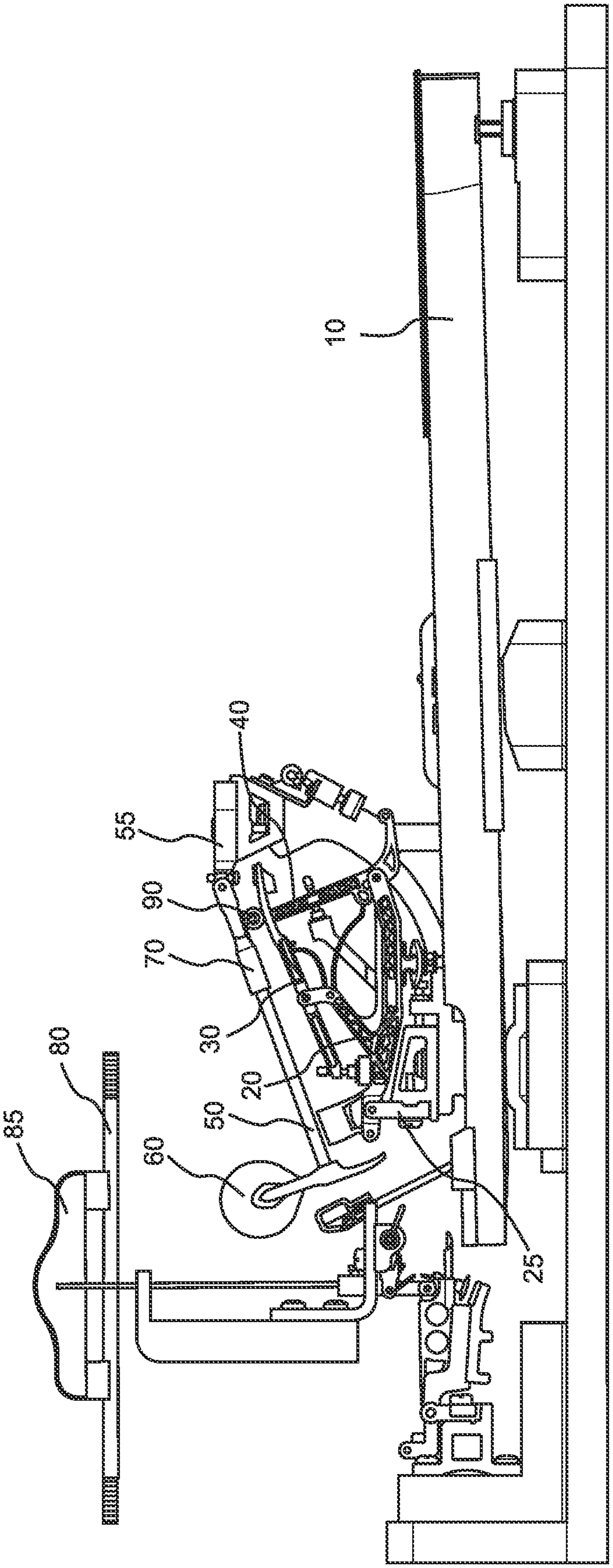
FIG. 1 is a side view of piano action and hammer action for a grand piano. The piano action and hammer action depicted is applicant's patented piano action and patented hammer action.
Figure 2:
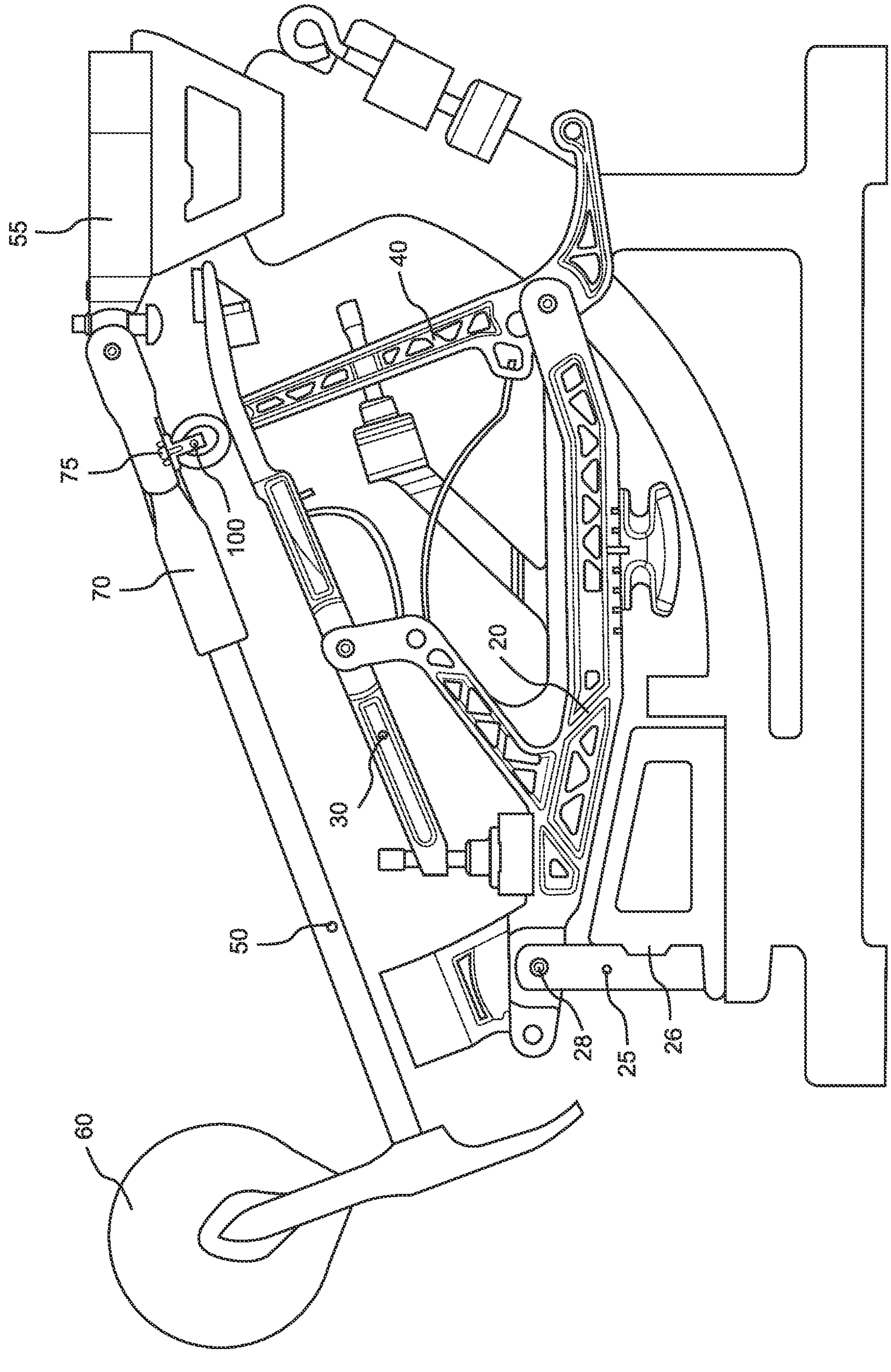
FIG. 2 is an enlarged view of FIG. 1.
Figure 3:
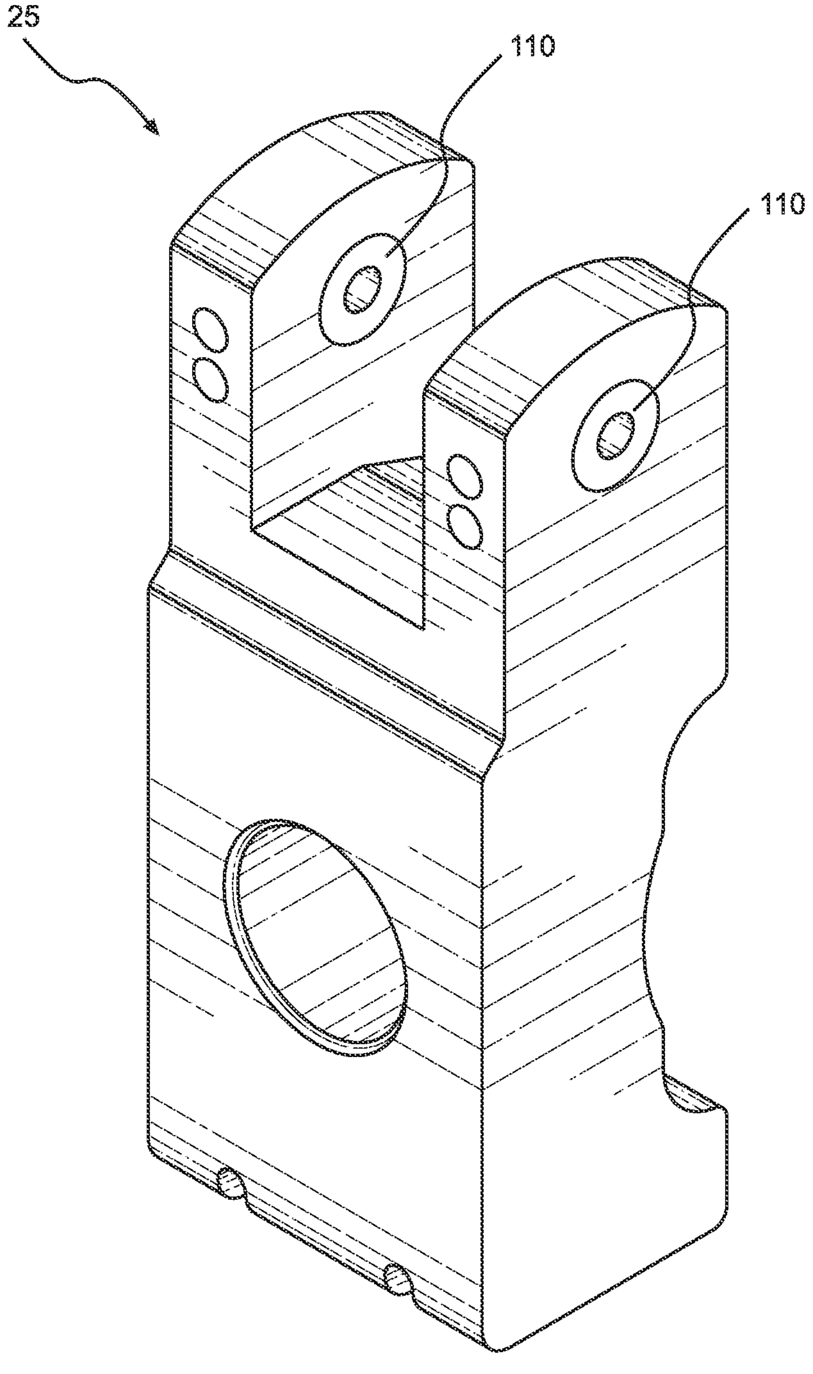
FIG. 3 is a perspective view of a wippen or repetition flange with Applicant's new wippen or repetition flange bushing installed therein.
Figure 4:
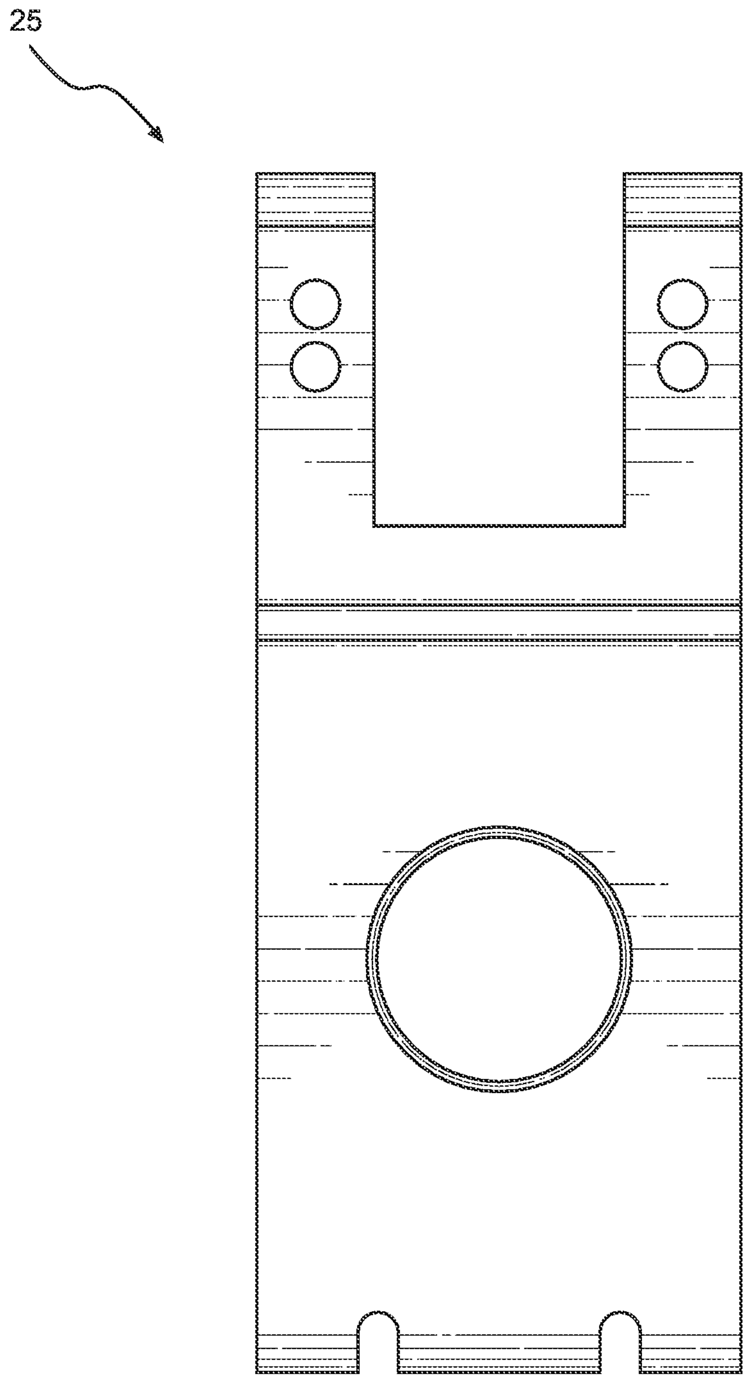
FIG. 4 is a front elevation view of a wippen or repetition flange with Applicant's new wippen or repetition flange bushing installed therein.
Figure 5:
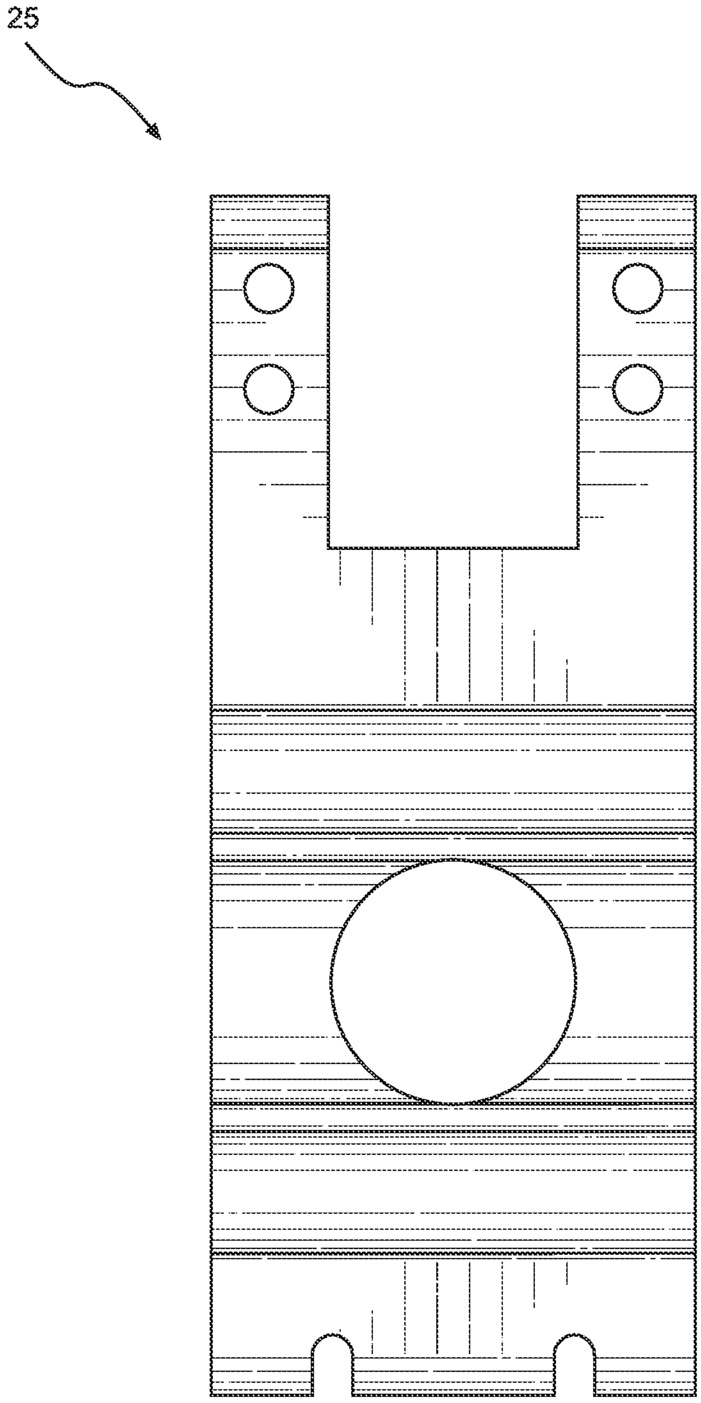
FIG. 5 is a rear elevation view of a wippen or repetition flange with Applicant's new wippen or repetition flange bushing installed therein.
Figure 6:
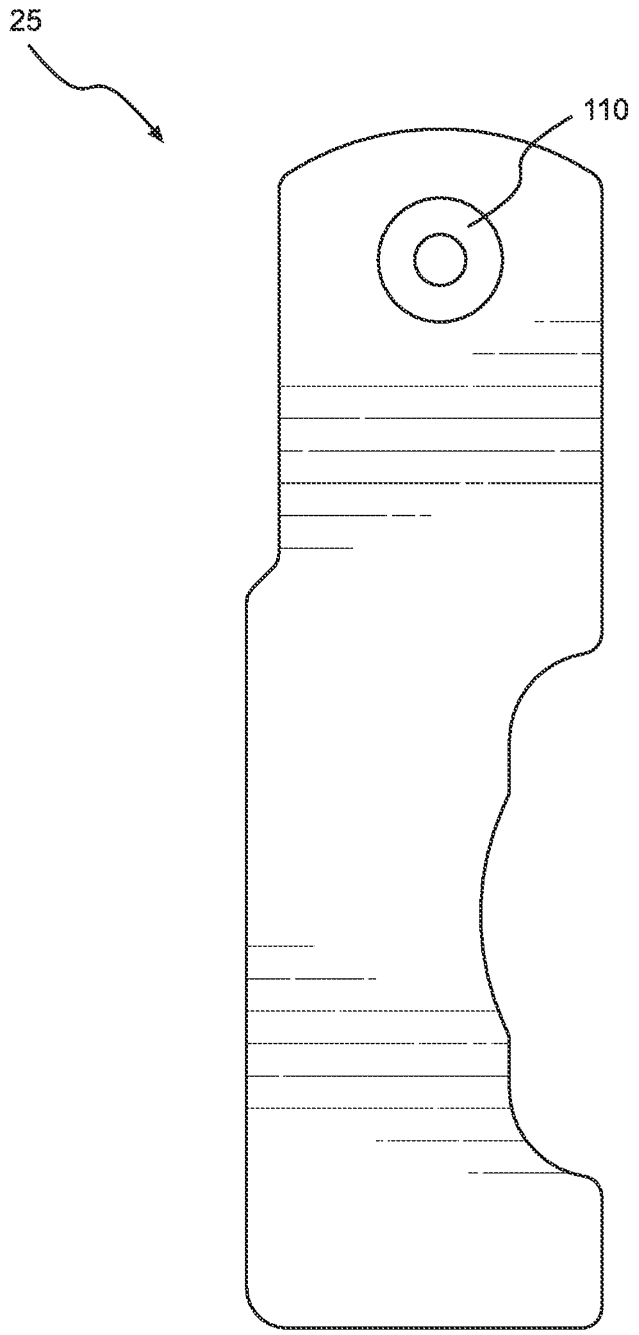
FIG. 6 is a left side elevation view of a wippen or repetition flange with Applicant's new wippen or repetition flange bushing installed therein.
Figure 7:
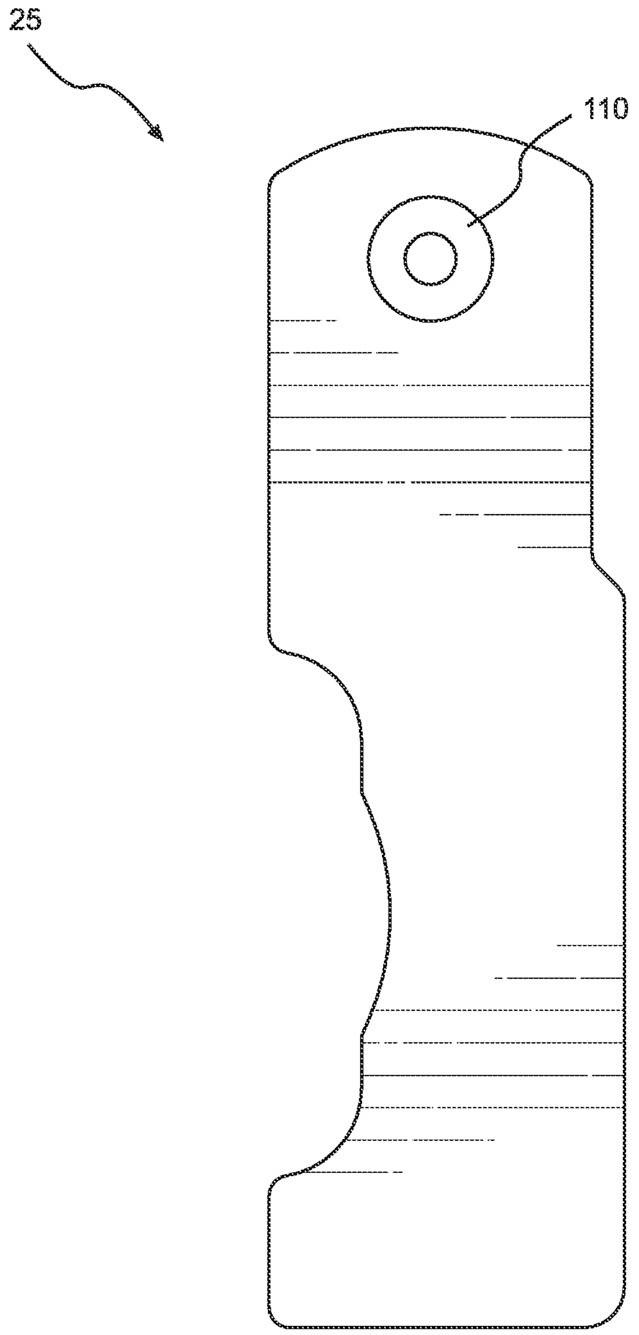
FIG. 7 is a right side elevation view of a wippen or repetition flange with Applicant's new wippen or repetition flange bushing installed therein.
Figure 8:
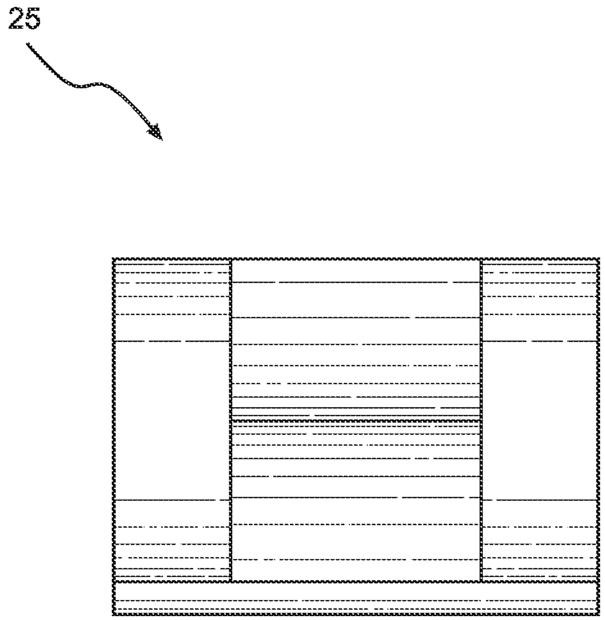
FIG. 8 is a top plan view of a wippen or repetition flange with Applicant's new wippen or repetition flange bushing installed therein.
Figure 9:
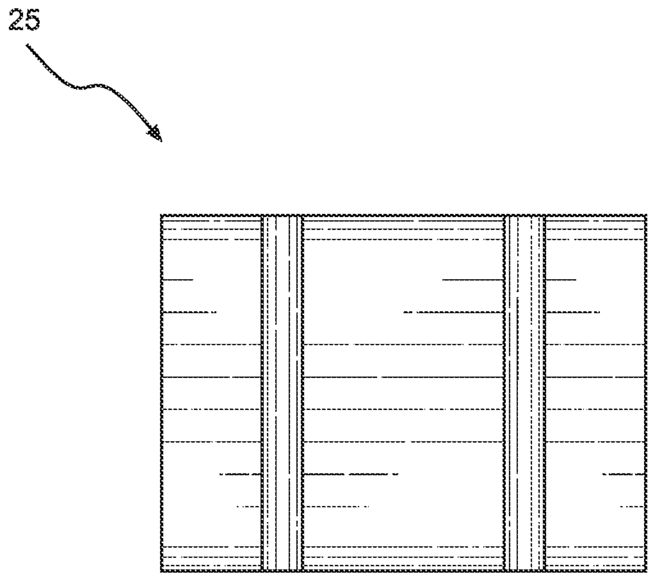
FIG. 9 is a bottom plan view of a wippen or repetition flange with Applicant's new wippen or repetition flange bushing installed therein.
Figure 10:
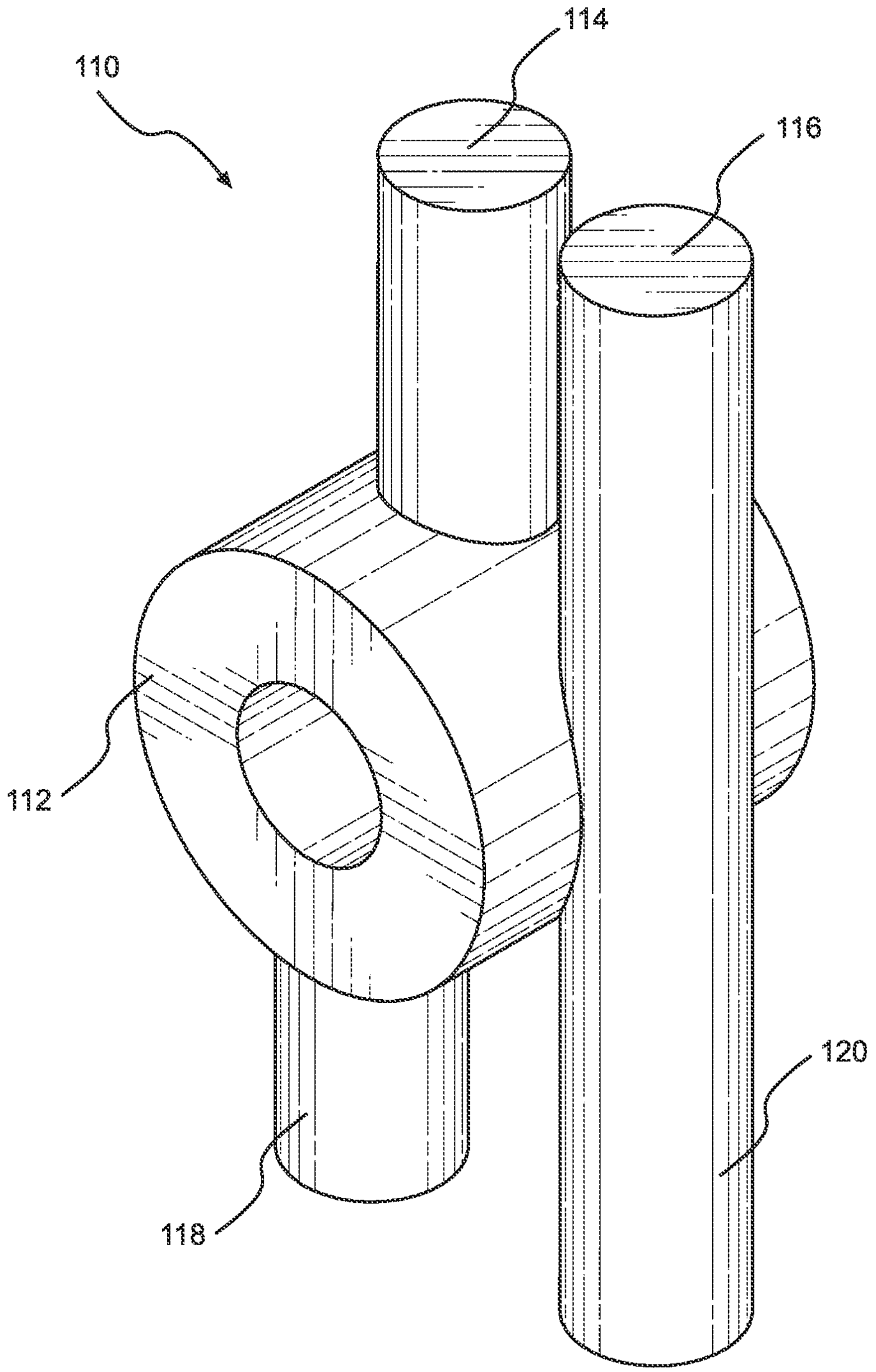
FIG. 10 is a perspective view of Applicant's new wippen or repetition flange bushing.
Figure 11:
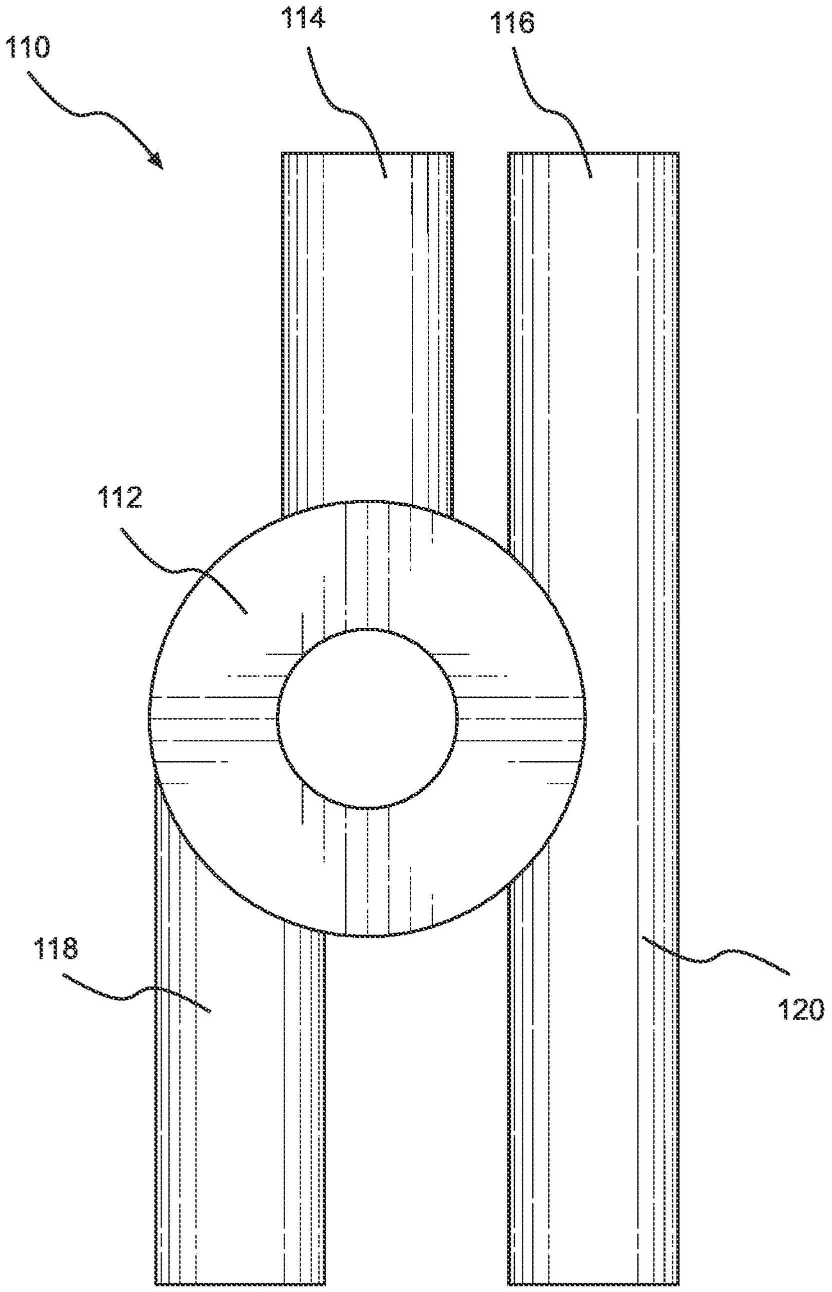
FIG. 11 is a front elevation view Applicant's new wippen or repetition flange bushing.
Figure 12:
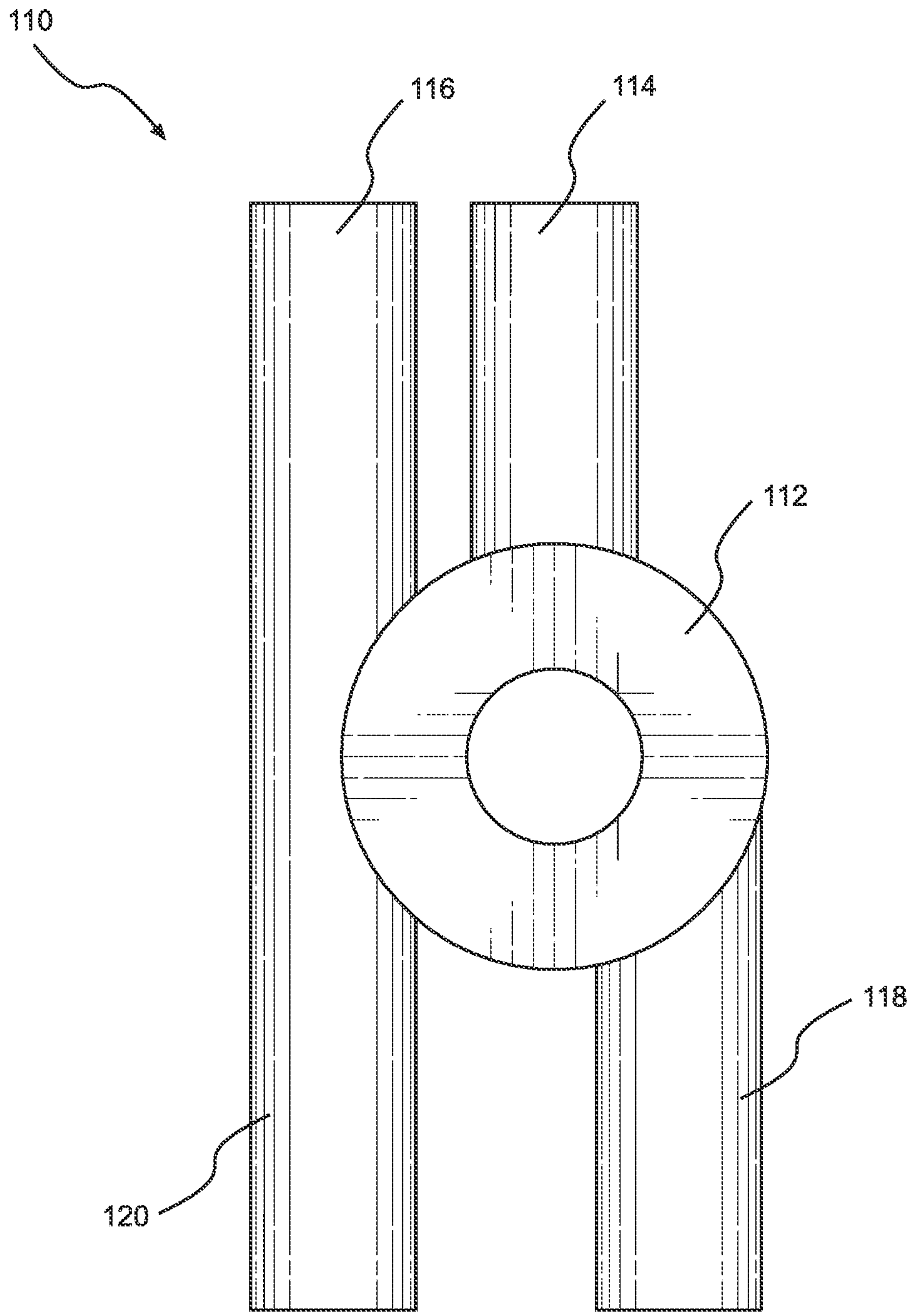
FIG. 12 is a rear elevation view of Applicant's new wippen or repetition flange bushing.
Figure 13:
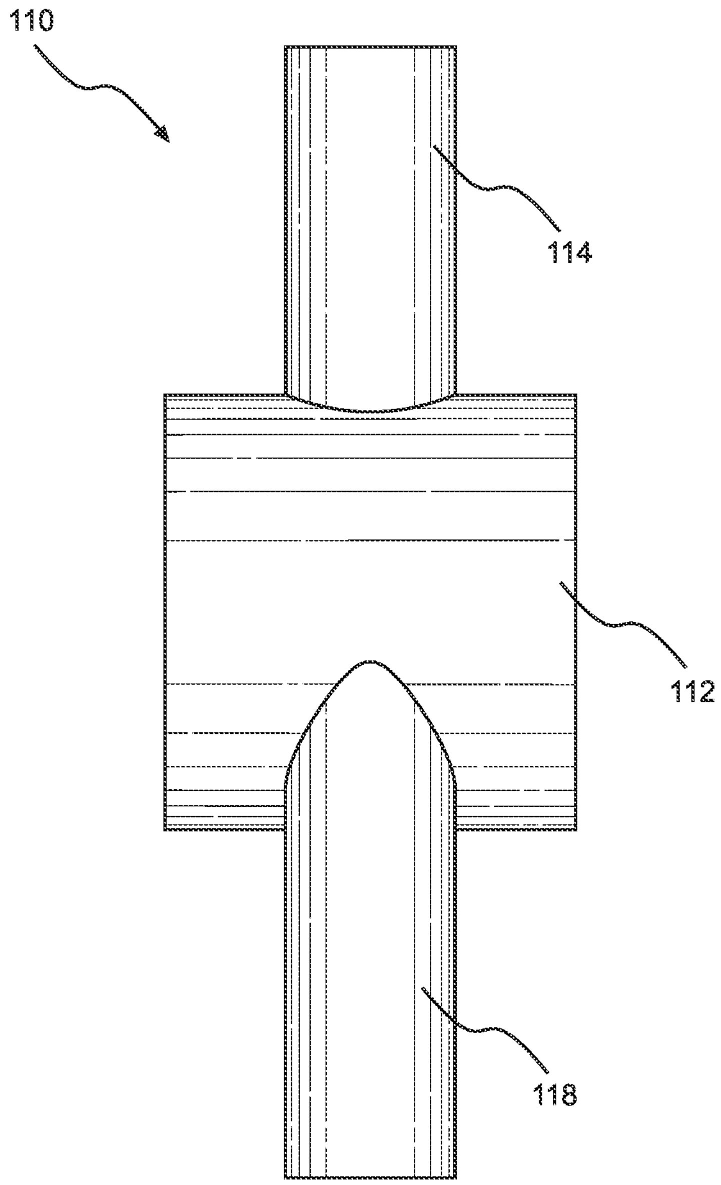
FIG. 13 is a right side elevation view of Applicant's new wippen or repetition flange bushing.
Figure 14:
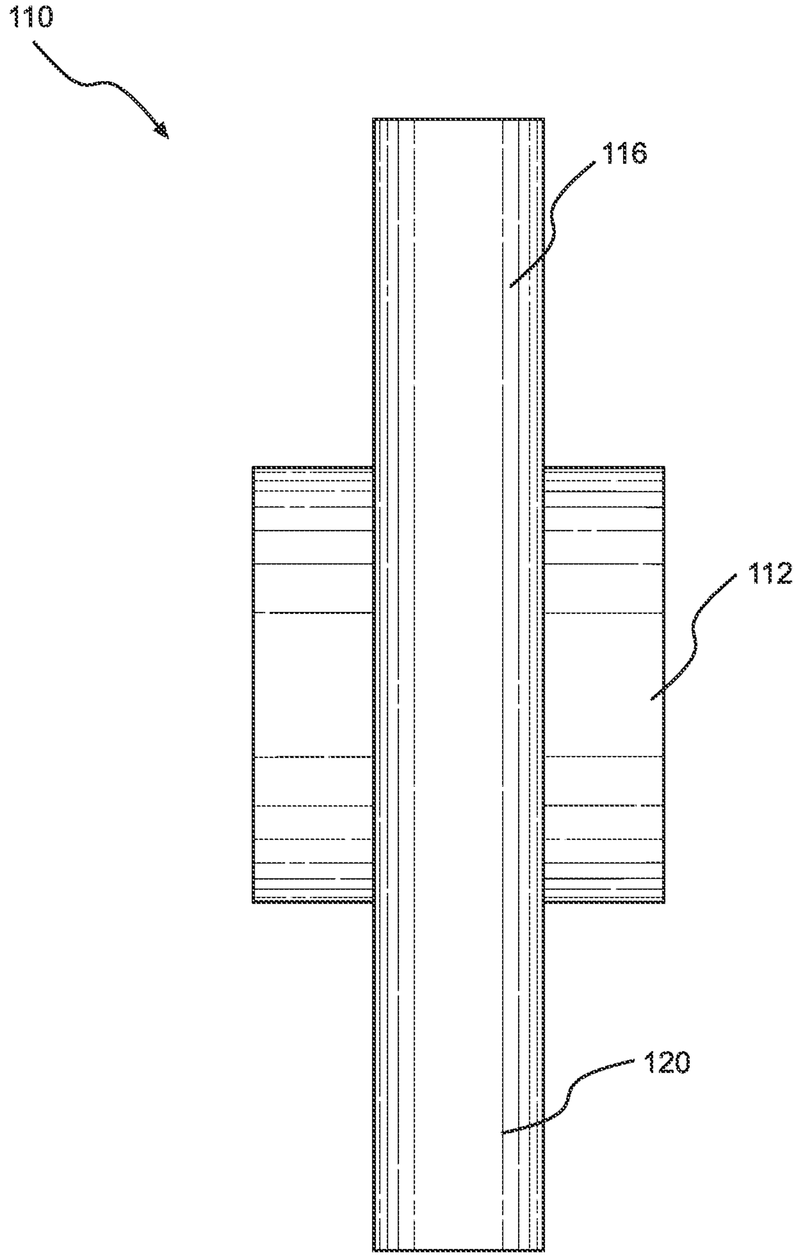
FIG. 14 is a left side elevation view of Applicant's new wippen or repetition flange bushing.
Figure 15:
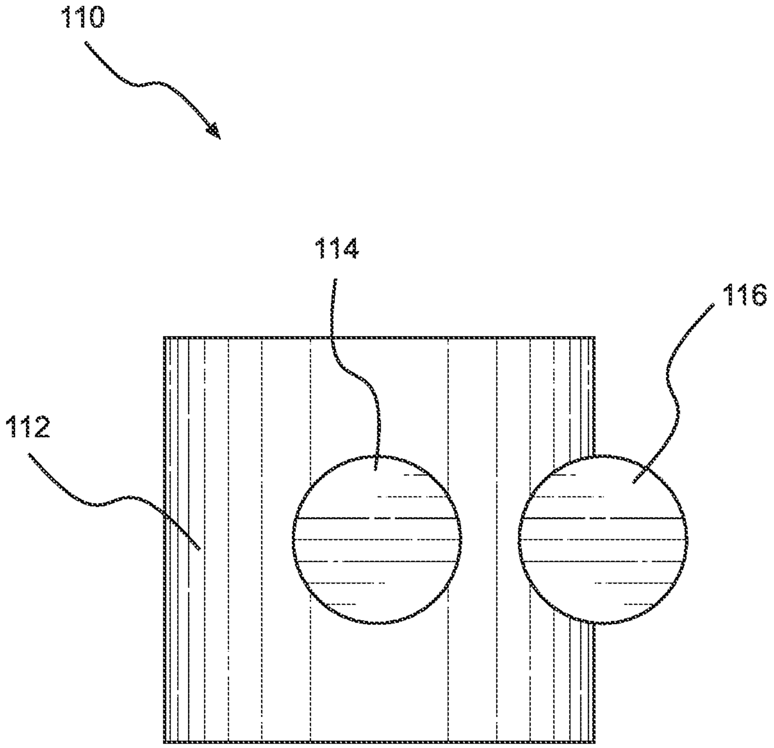
FIG. 15 is a top plan view of Applicant's new wippen or repetition flange bushing.
Figure 16:
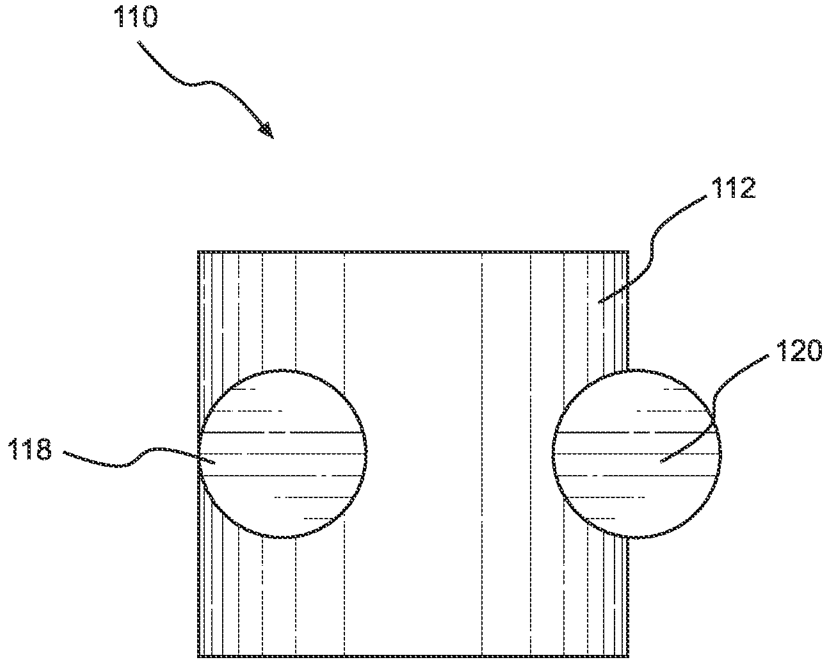
FIG. 16 is a bottom plan view of Applicant's new wippen or repetition flange bushing.

| Term | Definition |
|---|---|
| 10 | Piano Key |
| 20 | Wippen or Repetition |
| 25 | Wippen or Repetition Flange |
| 26 | Wippen or Repetition Rail |
| 28 | Wippen or Repetition Flange Pivot Pin |
| 30 | Repetition Lever or Balancier |
| 40 | Jack |
| 50 | Hammer Shank |
| 55 | Hammer Shank Flange |
| 60 | Hammer |
| 70 | Tubular Lever Interface |
| 75 | Scale on Tubular Lever Interface |
| 80 | Piano Strings |
| 85 | Damper Head |
| 90 | Prior Art Knuckle or Roller |
| 100 | Elliptical Silicone Knuckle or Roller |
| 110 | Wippen or Repetition Flange Bushing |
| 112 | Sleeve Member |
| 114 | Lower Proximal Support Post |
| 116 | Upper Proximal Support Post |
| 118 | Lower Distal Support Post |
| 120 | Upper Distal Support Post |

DETAILED DESCRIPTION OF THE INVENTION

A piano produces sound through a complicated mechanical chain reaction that occurs in the piano action which can be summarized as follows. A depressed piano key 10 gives rise to motion of the damper head assembly, separating the damper head 85 from the associated set of piano strings 80 and setting the piano strings 80 ready to accept vibrations. The depressed key 10 also actuates the piano action by pushing upwards on the wippen or repetition 20 to rotate the wippen or repetition 20 causing the wippen or repetition 20 to rotate upwards which pushes the repetition lever or balancier 30 and the jack 40 upwards. Since the repetition lever or balancier 30 and the jack 40 are in contact with the knuckle or roller 90 at the rest position, the upwards movement of the repetition lever or balancier 30 and the jack 40 causes the hammer assembly to rotate. The upwards movement of the repetition lever or balancier 30 and the jack 40 pushes upwards on the knuckle or roller 90 which is attached to the base of the hammer shank 50. The upwards movement of the knuckle or roller 90 causes the hammer shank 50 and the hammer 60 to rotate thereby pushing or “throwing” the hammer 60 and hammer shank 50 into the associated set of piano strings 80. The hammer 60 strikes the piano strings 80 and generates a piano tone. The piano action then receives or “catches” the hammer 60 and hammer shank 50 after it strikes the piano strings 80 and rebounds back against the piano action. When the pianist releases the depressed piano key 10, the piano key 10 returns to the rest position, and permits the damper head assembly to return contact with the vibrating piano strings 80. The vibrations are absorbed by the damper head 85, and the piano tone is terminated.

A traditional grand piano action comprises: a piano key 10; a wippen or repetition 20; a wippen or repetition flange 25; a repetition lever or balancier 30; a jack 40; a hammer shank 50; a hammer shank flange 55; a hammer 60; a hammer shank butt; and a knuckle or roller 90. Applicant has improved the traditional grand piano action design with U.S. Pat. No. 7,687,693 entitled “GRAND PIANO COMPOSITE PIANO ACTION” and U.S. Pat. No. 7,687,694 entitled “LOW INERTIA GRAND PIANO ACTION”. Applicant has also improved the traditional hammer assembly design with U.S. Pat. No. 8,143,506 entitled “HAMMER ASSEMBLY FOR GRAND PIANO” and U.S. Pat. No. 11,756,513 entitled “ELLIPTICAL SILICONE ROLLER FOR GRAND PIANO ACTION WITH CUSTOMIZED DUROMETER READING”. Applicant has also improved the traditional hammer shank flange design with U.S. Pat. No. 8,487,172 entitled “PIANO ACTION FLANGE WITH OPEN-SLOTTED RAIL ATTACHMENT FEATURE”.

Applicant’s improved grand piano action comprises: a piano key 10; a wippen or repetition 20; a wippen or repetition flange 25; a repetition lever or balancier 30; a jack 40; a hammer shank 50; a hammer shank flange 55; a hammer 60; a tubular lever interface 70; and a moveable knuckle or roller 95. Each a wippen or repetition flange 25 is rigidly attached to wippen or repetition rail 26 wherein each of these members remains stationary during piano action rotation or cycling. Each wippen or repetition 20 is pivotally attached to a wippen or repetition flange 25 by a wippen or repetition pivot pin 28 and a wippen or repetition flange bushing 110. Pivotal attachment is such that each wippen or repetition flange bushing 110 remains stationary during rotation because each wippen or repetition flange bushing 110 is rigidly attached to a wippen or repetition flange 25 while each wippen or repetition pivot pin 28 rotates withing a wippen or repetition flange bushing 110 because each wippen or repetition pivot pin 28 is rigidly attached to a wippen or repetition 20 which rotates during piano action rotation or cycling. A repetition pivot pin 28 is a standard part with standard sizing that is used for all grand piano actions. Optionally, wippen or repetition pivot pin 28 may also rotate within wippen or repetition 20 during piano action rotation or cycling.

Wippen or repetition flange bushing 110 comprises: a sleeve member 112; a lower proximal support post 114; an upper proximal support post 116; a lower distal support post 118; and an upper distal support post 120. Wippen or repetition flange bushing 110 is one injection molded part therefore sleeve member 112 is integral with lower proximal support post 114 which is integral with upper proximal support post 116 which is integral with lower distal support post 118 which is integral with upper distal support post 120 to form a one-piece structure. Wippen or repetition flange bushing 110 is molded directly into the wippen or repetition flange 25. The wippen or repetition flange 25 acts as the mold from which the wippen or repetition flange bushing 110 is molded into. Thus, the wippen or repetition flange 25 must have the inverse shape of wippen or repetition flange bushing 110 carved away from the wippen or repetition flange 25. This type of injection molding is commonly referred to as “insert molding” wherein the wippen or repetition flange bushing 110 is inserted into the injection mold and then the wippen or repetition flange bushing 110 is molded directly into the inserted wippen or repetition flange bushing 110. In addition to the wippen or repetition flange 25, a core pin (not depicted) must also be inserted into the injection mold prior to molding the wippen or repetition flange bushing 110, so that the hole for the wippen or repetition pivot pin 28 may be molded into the wippen or repetition flange bushing 110. A core pin is a commonly known product used in plastic molding and die casting. The core pin must be positioned and located precisely and accurately to yield a hole for the wippen or repetition pivot pin 28 that is exactly perpendicular to the surface of the wippen or repetition flange 25 and exactly perpendicular to the plane of rotation of the hammer shank 50. After molding is complete, the entire wippen or repetition flange bushing 110 is removed from the injection mold with the wippen or repetition flange bushing 110 molded directly into the wippen or repetition flange bushing 110. The core pin used to mold the hole for the wippen or repetition pivot pin 28 must also be removed from the wippen or repetition flange bushing 110. Wippen or repetition flange bushing 110 may be made from any known type of plastic or composite material.

Sleeve member 112 is a rigid or semi-rigid annular cylinder member. This type of geometric shape is commonly known as a sleeve. Sleeve member 112 has a length, an overall width, an inner surface, an outer surface, an inner diameter, an outer diameter, and a longitudinal axis. Sleeve member 112 essentially is the piano action bushing itself. Sleeve member 112 is a sleeve bushing. The inner diameter of sleeve member 112 is sized to make a slip fit, clearance fit, or press fit with the outer diameter of wippen or repetition flange pivot pin 28.

As stated, wippen or repetition flange bushing 110 is a bushing with four supports posts projecting out from the surface of the bushing. The four support posts projecting out from the bushing are: the lower proximal support post 114; the upper proximal support post 116; the lower distal support post 118; and the upper distal support post 120. The nomenclature or assigned names of these four support posts arises from the position of each support post as seen from a pianist playing a piano equipped with the wippen or repetition flange bushings 110. With every grand piano, there is a horizontal row of wippen or repetition flanges 25 that runs parallel with the row of piano keys 10 before the pianist. Thus, the horizontal row of wippen or repetition flanges 25 runs from left to right or right to left horizontally as seen from the pianist. This horizontal row of wippen or repetition flanges 25 is positioned with the longitudinal axis of each sleeve member 112 also running horizontal and parallel with the row of piano keys 10. Thus, the longitudinal axis of each sleeve member 112 also runs from left to right or right to left horizontally as seen from the pianist. There are four support posts that project out ward from each sleeve member 112. Each support post has a longitudinal axis that is also horizontal but perpendicular to the longitudinal axis of each sleeve member 112. Thus, the longitudinal axis of each support post runs from front to back or back to front horizontally as seen from the pianist. From the pianist's frame of reference, there is a lower proximal support post that is the lower proximal support post 114, an upper proximal support post that is the upper proximal support post 116, a lower distal support post that is the lower distal support post 118, and an upper distal support post that is the upper distal support post 120. Proximal means close or near. Distal means far or away from.

Lower proximal support post 114 is an elongated appendage or projection extending outward from the outer surface of sleeve member 112. Lower proximal support post 114 has a first end, a second end, length, an overall width, an exterior surface, and a longitudinal axis. Lower proximal support post 114 extends outward from the lower proximal side of the sleeve member 112 as seen from a pianist playing the piano in which the piano action is functioning therein. The first end of lower proximal support post 114 is rigidly attached to the outer surface of sleeve member 112 as depicted. The second end of lower proximal support post 114 projects toward the pianist as depicted. The longitudinal axis of lower proximal support post 114 is horizontal and perpendicular to the longitudinal axis of sleeve member 112 as depicted. The longitudinal axis of lower proximal support post 114 is parallel with that of upper proximal support post 116. The lower proximal support post 114 is located just underneath upper proximal support post 116.

Upper proximal support post 116 is an elongated appendage or projection extending outward from the outer surface of sleeve member 112. Upper proximal support post 116 has a first end, a second end, length, an overall width, an exterior surface, and a longitudinal axis. Upper proximal support post 116 extends outward from the upper proximal side of the sleeve member 112 as seen from a pianist playing the piano in which the piano action is functioning therein. The first end of upper proximal support post 116 is rigidly attached to the outer surface of sleeve member 112 as depicted. The second end of upper proximal support post 116 projects toward the pianist as depicted. The longitudinal axis of upper proximal support post 116 is horizontal and perpendicular to the longitudinal axis of sleeve member 112 as depicted. The longitudinal axis of upper proximal support post 116 is parallel with that of lower proximal support post 114. The upper proximal support post 116 is located just above lower proximal support post 114. In some modes, the first end of upper proximal support post 116 may partially connect with or be attached to the first end of upper distal support post 118, as depicted.

Lower distal support post 118 is an elongated appendage or projection extending outward from the outer surface of sleeve member 112. Lower distal support post 118 has a first end, a second end, length, an overall width, an exterior surface, and a longitudinal axis. Lower distal support post 118 extends outward from the lower distal side of the sleeve member 112 as seen from a pianist playing the piano in which the piano action is functioning therein. The first end of lower distal support post 118 is rigidly attached to the outer surface of sleeve member 112 as depicted. The second end of lower distal support post 118 projects away from pianist as depicted. Lower distal support post 118 is parallel with upper distal support post 120 and is located just underneath upper distal support post 120. The longitudinal axis of lower distal support post 118 is horizontal and perpendicular to the longitudinal axis of sleeve member 112 as depicted. The longitudinal axis of lower distal support post 118 is parallel with that of upper distal support post 120. The lower distal support post 118 is located just underneath upper distal support post 120.

Upper distal support post 120 is an elongated appendage or projection extending outward from the outer surface of sleeve member 112. Upper distal support post 120 has a first end, a second end, length, an overall width, an exterior surface, and a longitudinal axis. Upper distal support post 120 extends outward from the upper distal side of the sleeve member 112 as seen from a pianist playing the piano in which the piano action is functioning therein. The first end of upper distal support post 120 is rigidly attached to the outer surface of sleeve member 112 as depicted. The second end of upper distal support post 120 projects away from pianist as depicted. Upper distal support post 120 is parallel with lower distal support post 118 and is located just above lower distal support post 118. The longitudinal axis of upper distal support post 120 is horizontal and perpendicular to the longitudinal axis of sleeve member 112 as depicted. The longitudinal axis of upper distal support post 120 is parallel with that of lower distal support post 118. The upper distal support post 120 is located just above lower distal support post 118. In some modes, the first end upper distal support post 120 may partially connect with or be attached to the first end upper proximal support post 116, as depicted.

Applicant has experimented with many different quantities, shapes, and locations of support posts. Applicant has determined that the above arrangement works best to eliminate the deformation of the bushing or sleeve member 112 resulting from shrinkage. The above arrangement of support posts eliminates shrinkage and deformation of the bushing or sleeve member 112. Of course, shrinkage still does occur from the injection molding process as with all injection molding processes. However, for all practical purposes, the shrinkage occurs in the support posts themselves and not in the bushing or sleeve member 112. Each support post shrinks upon the cooling of the liquid material to form a solid part. Essentially the length of each support post reduces or shrinks which pushes on the of the bushing or sleeve member 112 or applies pressure to the bushing or sleeve member 112 in order to hold the bushing or sleeve member 112 true to its annular cylinder shape and to keep the bushing or sleeve member 112 true, circular, and without deformation from the circular shape.

What is claimed is:

1. A wippen or repetition flange bushing for a piano comprising: a sleeve member; a lower proximal support post; an upper proximal support post; a lower distal support post; and an upper distal support post, wherein, said sleeve member is a rigid annular cylinder member with a length, an overall width, an inner surface, an outer surface, an inner diameter, an outer diameter, and a longitudinal axis, wherein said longitudinal axis of said sleeve member is horizontal that runs from left to right or right to left as seen from the pianist and said outer surface of said sleeve member has a lower proximal side, an upper proximal side, a lower distal side, and an upper distal side, said lower proximal support post is an elongated appendage or projection extending outward from said lower proximal side of said outer surface of said sleeve member, wherein said lower proximal support post has a longitudinal axis that is horizontal and perpendicular to said longitudinal axis of said sleeve member, that runs from front to back or back to front as seen from the pianist, said upper proximal support post is an elongated appendage or projection extending outward from said upper proximal side of said outer surface of said sleeve member, wherein said upper proximal support post has a longitudinal axis that is horizontal and perpendicular to said longitudinal axis of said sleeve member, that runs from front to back or back to front as seen from the pianist, said lower distal support post is an elongated appendage or projection extending outward from said lower distal side of said outer surface of said sleeve member, wherein said lower distal support post has a longitudinal axis that is horizontal and perpendicular to said longitudinal axis of said sleeve member, that runs from front to back or back to front as seen from the pianist, and said upper distal support post is an elongated appendage or projection extending outward from said upper distal side of said outer surface of said sleeve member, wherein said lower distal support post has a longitudinal axis that is horizontal and perpendicular to said longitudinal axis of said sleeve member that runs from front to back or back to front as seen from the pianist.

2. A wippen or repetition flange bushing for a piano comprising: a sleeve member; a lower proximal support post; an upper proximal support post; a lower distal support post; and an upper distal support post, wherein, said sleeve member is a semi-rigid annular cylinder member with a length, an overall width, an inner surface, an outer surface, an inner diameter, an outer diameter, and a longitudinal axis, wherein said longitudinal axis of said sleeve member is horizontal that runs from left to right or right to left as seen from the pianist and said outer surface of said sleeve member has a lower proximal side, an upper proximal side, a lower distal side, and an upper distal side, said lower proximal support post is an elongated appendage or projection extending outward from said lower proximal side of said outer surface of said sleeve member, wherein said lower proximal support post has a longitudinal axis that is horizontal and perpendicular to said longitudinal axis of said sleeve member, that runs from front to back or back to front as seen from the pianist, said upper proximal support post is an elongated appendage or projection extending outward from said upper proximal side of said outer surface of said sleeve member, wherein said upper proximal support post has a longitudinal axis that is horizontal and perpendicular to said longitudinal axis of said sleeve member, that runs from front to back or back to front as seen from the pianist, said lower distal support post is an elongated appendage or projection extending outward from said lower distal side of said outer surface of said sleeve member, wherein said lower distal support post has a longitudinal axis that is horizontal and perpendicular to said longitudinal axis of said sleeve member, that runs from front to back or back to front as seen from the pianist, and said upper distal support post is an elongated appendage or projection extending outward from said upper distal side of said outer surface of said sleeve member, wherein said lower distal support post has a longitudinal axis that is horizontal and perpendicular to said longitudinal axis of said sleeve member that runs from front to back or back to front as seen from the pianist.

* * * * *